Nov. 13, 1923.
C. NOBLE
MOTOR LOGGING TRACTOR
Filed Dec. 20, 1921
1,474,282
3 Sheets-Sheet 1
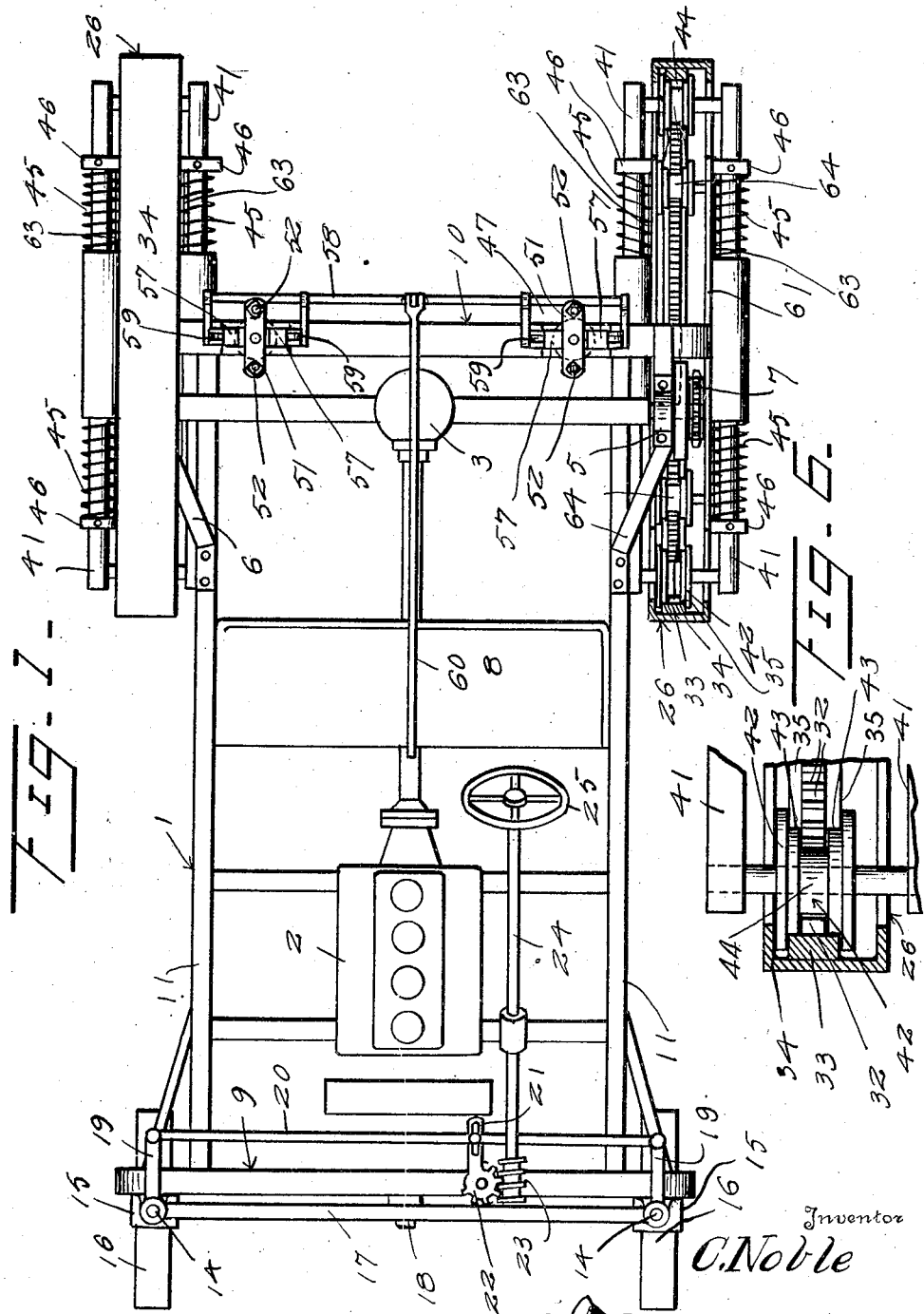
Inventor
C. Noble

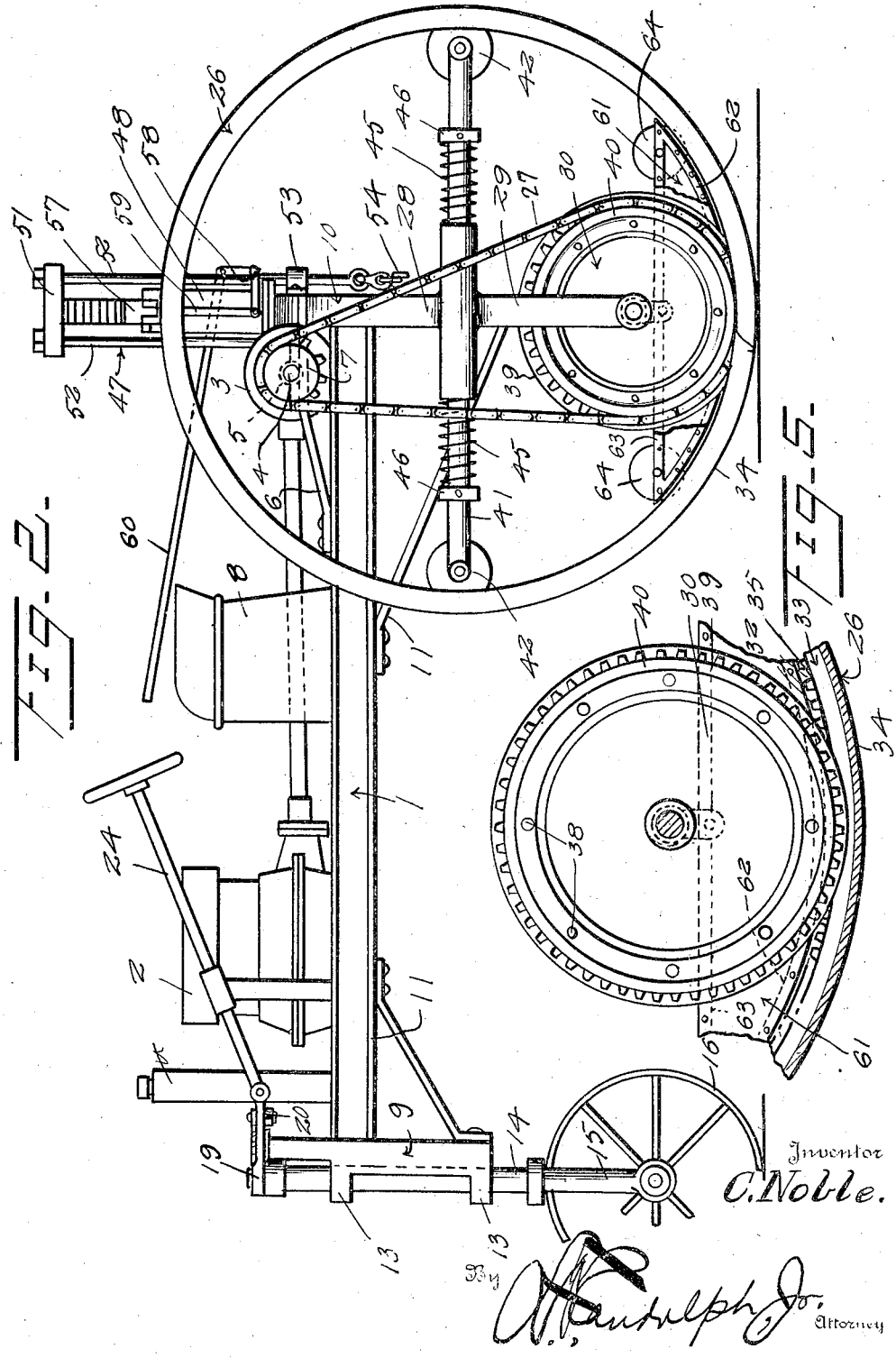

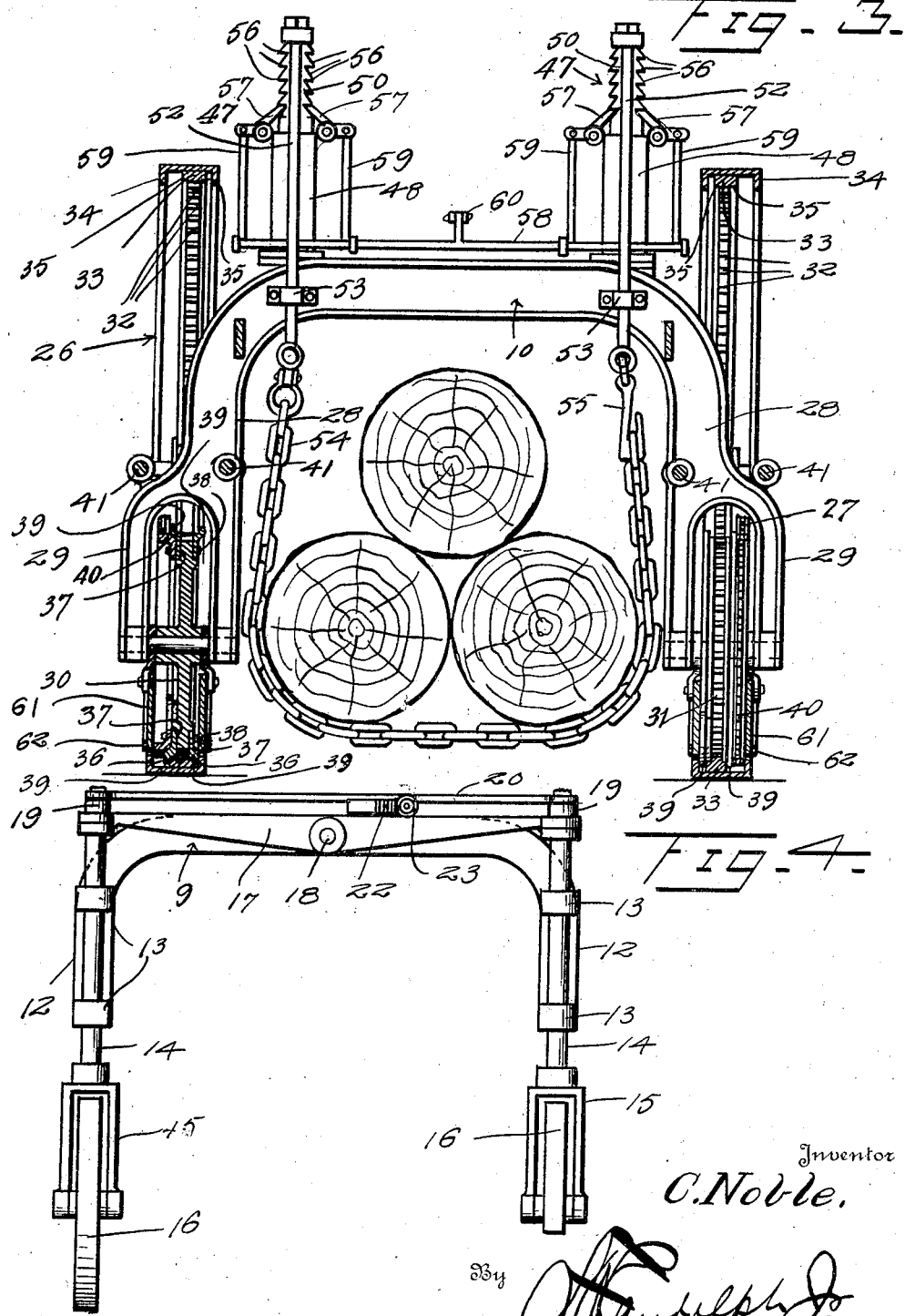

Patented Nov. 13, 1923.

1,474,282

UNITED STATES PATENT OFFICE.

CHARLES NOBLE, OF SISSON, CALIFORNIA.

MOTOR LOGGING TRACTOR.

Application filed December 20, 1921. Serial No. 523,676.

*To all whom it may concern:*

Be it known that I, CHARLES NOBLE, a citizen of Nova Scotia, residing at Sisson, in the county of Siskiyou and State of California, have invented certain new and useful Improvements in a Motor Logging Tractor; and I do hereby declare the following to be a full, clear, and exact description of the invention, such as will enable others skilled in the art to which it appertains to make and use the same.

This invention relates to new and useful improvements in tractors adapted for logging or for hauling logs by having them suspended therefrom and has for its primary object the provision of a device of the above stated character that may be driven forwardly over or astride of the logs and provided with means whereby the logs may be raised and supported for hauling to the desired place by the device.

Another object of this invention is the provision of improved drive wheels for the device that have increase-traction obtaining qualities over ordinary spoke wheels and which will reduce the amount of motor power necessary to propel the device and also facilitate the traveling of the device on soft ground.

A further object of this invention is the provision of a tractor of the above stated character which will be simple, durable and efficient, and which may be manufactured and sold at a comparatively low cost.

With these and other objects in view as will become more apparent as the description proceeds, the invention consists in such noval features of construction, combination and arrangement of parts which will be hereinafter more fully described and claimed.

For a complete understanding of my invention, reference will be had to the following description and accompanying drawings, in which:

Figure 1 is a top plan view partly in section illustrating a tractor constructed in accordance with my invention.

Figure 2 is a side elevation, illustrating the same.

Figure 3 is a transverse sectional view, illustrating the logs suspended from the device and showing the construction of the drive wheel.

Figure 4 is a front elevation, illustrating the front or steering wheels.

Figure 5 is a side elevation illustrating one of the drive wheels with one of the side flanges removed.

Figure 6 is a sectional view, illustrating the same and one of the guide rollers.

Referring in detail to the drawing, the numeral 1 indicates a tractor frame or chassis carrying at its front end an internal combustion engine 2 having driving connection with a differential 3 that includes axles or shafts 4 mounted in bearings 5, carried by brackets 6 located on the chassis 1 and said axles or shafts carry at their outer ends sprocket wheels 7 which are arranged outwardly of the side of the chassis or frame. A driver's seat is mounted on the frame or chassis rearwardly of the engine 2. The frame or chassis comprises arched front and rear axles 9 and 10 connected by side members or bars 11 preferably constructed of I-beam material and the axles are constructed from corresponding material. The front axle 9 being of the arch type permits the tractor or the front end thereof to straddle objects and provides vertical portions 12 provided with journals or bearings 13 to rotatably receive stems 14 that are provided with forked lower ends 15 between which are journaled front or steering wheels 16. The stems 14 are free to slide upwardly and downwardly within the bearings 13 and have their upper ends journaled to the ends of an equalizing bar 17 which is pivoted intermediate its ends to the front axle 9 as illustrated at 18. The equalizing bar is adapted to permit the front or steering wheels to conform or pass readily over uneven ground without affecting the frame or chassis of the tractor. Rearwardly extending arms 19 are formed on the upper ends of the stems 14 and are connected by a steering bar 20 which is in turn pivoted to an arm 21 forming an integral part of a segment 22. The segment is suitably mounted on the front axle and meshes with a worm 23 carried by the lower end of the steering column 24 and which is provided with a steering wheel 25 located in close proximity to the seat 8.

The rear axle 10 is equipped with drive wheels 26 that are rotated through the medium of sprocket chains 27 trained over the sprocket wheels 7 secured to the ends of the shafts 4. The rear axle 10 being of arched formation provides vertical portions 28 that are bifurcated to form forks 29 to which are journaled load carrying wheels 30. The wheels 30 are constructed from several castings and have keyed or otherwise secured to their periphery ring gears 31 adapted to mesh with teeth 32 forming a part of ring gears 33 secured to the inner faces of rims or annular tracks 34. The ring gears 33 at each side of the teeth 32 are provided with bearing faces 35 to be engaged by bearing faces 36 that form part of removable flanges 37 that are secured to the load carrying wheels by bolts or similar fasteners 38. Portions of the flanges 37 project beyond the bearing faces 36 to form guide portions 39 that engage the side faces of the ring gears 33 carried by the rims or annular tracks. It should be apparent that the arrangement of parts described will prevent the load carrying wheels from moving laterally with respect to the rims or annular tracks and that a driving connection is established between the load carrying wheels and the rims or annular tracks. Sprocket gears 40 are secured to the load carrying wheels by the fasteners 38 and are engaged by the sprocket chains 27 whereby the ground wheels are rotated by the engine 2 and the rotation of said wheels impart rotation to the rims or annular tracks.

Pairs of longitudinally extending tubular guides are formed on the vertical portions 28 of the rear axle 10 and slidably support guide rods 41 that have journaled to their ends, guide rollers 42 provided with bearing faces 43 adapted to contact with the bearing faces 35 of the ring gears 33 and said guide rollers are provided with annular grooves 44 for the purpose of receiving the teeth 32 of the ring gears without said rollers coming in contact with the teeth. The guide rods 41 and guide rollers are adapted to keep the rims or annular tracks in alignment with the load carrying wheels and the guide rods 41 have shock absorbing springs 45 mounted thereon which springs bear against the ends of the tubular guides and also are adapted to be engaged by collars 46 secured to the guide rods for the purpose of absorbing shocks and jars when the rims or annular tracks come in contact with obstacles.

Drive wheels constructed in accordance with the foregoing description will during their rotation have a tendency to mash the ground flat or downwardly instead of having a tendency to push the ground as in wheels of the spoke type, also the arrangement of parts permit the wheels to readily obtain traction in soft ground and also reduce the amount of motive power necessary to propel or rotate the wheels. When the rims or annular tracks engage obstacles in the road way, they yield owing to the guide rods being slidable in the tubular guides consequently causing the load carrying wheels to move forwardly beyond the vertical axis of the rims or annular tracks until the latter overcomes the obstacle. The front and rear axles being of the arch type permit the tractor to be driven over logs piled one upon the other or in other words to permit the axles to straddle the logs whereby obviating the necessity of backing the tractor over the piles of logs as now customary in tractors employing an unarched front axle or a tractor of a single steering wheel type.

The rear axle carries hydraulic means 47 used to raise and support the pile of logs in a suspended position under the structure. The hydraulic means 47 includes hydraulic cylinders 48 adapted to receive air pressure from any suitable source (not shown) and which air pressure may be conveniently controlled in any well known manner. The cylinders 48 are provided with pistons having stems 50 to which cross heads 51 are secured. Rods 52 are secured to the ends of the cross heads and are slidably mounted in bearings 53 carried by the rear axle and have connected thereto tie chains 54 and which chains have one of their ends detachably connected to one pair of the rods 52 by hooks 55 to facilitate the application or removal of the tie chains from the logs. The piston stems 50 are provided with a series of teeth 56 adapted to be engaged by dogs 57 pivoted to the cylinders for the purpose of holding the stems in position or to lock the stems in their positions so that the logs may be held in a suspended position. A control rod 58 is carried by the chassis or frame 1 and is connected to the dogs by links 59 and also to a controlling lever 60 located adjacent the seat 8 whereby the driver or operator may engage and disengage the dogs from the teeth when desired.

Shields or protectors 61 are associated with the load carrying wheels 26 for the purpose of preventing foreign matter from entering or coming in contact with the ring gears 33 where they mesh with the teeth of the wheels 30 and include side semicircular plates 62 secured to reinforcing elements 63 and are provided with guide rollers 64 adapted to engage the annular tracks or wheels 26. The shields or protectors are connected to the forks of the rear axle 28.

From the foregoing description taken in connection with the drawings, it should be apparent that a tractor constructed in accordance with the foregoing may be readily and quickly loaded and unloaded with logs and that the load is supported in close proximity to the ground so as to prevent the tractor from easily turning over and also a tractor constructed with drive wheels of the character described permit the employment of a much smaller horsepower engine than otherwise would be required if the tractor employed wheels of the spoke type as driving mediums.

While I have shown and described the preferred embodiment of my invention, it will be understood that minor changes in construction, combination and arrangement of parts may be made without departing from the spirit and scope of the invention as claimed.

Having thus described the invention, what I claim is:—

1. A tractor construction comprising arched rear axles having bifurcated ends, load carrying wheels journaled to the bifurcated ends of the axle, annular tracks engaged by the load carrying wheels, teeth on said tracks, ring gears secured to the load carrying wheels and engaging the teeth to establish driving connection between the load carrying wheels and the tracks.

2. A tractor construction comprising an arched axle, load carrying wheels journaled to said axle, ring gears secured to said wheels, annular tracks, ring gears secured to said tracks and engaged by the teeth of the gears of the load carrying wheels and having bearing portions, guide flanges secured to the load carrying wheels and having bearing portions to engage the bearing portions of the gears carried by the tracks.

3. In a tractor construction, an arched axle, load carrying wheels journaled to said axle, annular tracks, driving connections between the load carrying wheels and the tracks, and guide means carried by the axle and engaging the tracks.

4. In a tractor construction, an arched axle, load carrying wheels journaled to said axle, annular tracks engaged by said wheels, driving connections between said wheels and tracks, and yieldable guide means carried by the axle and engaging the tracks.

5. In a tractor construction, an axle, load carrying wheels journaled to said axle, annular tracks engaged by said wheels, driving connections between said wheels and tracks, guides carried by said axle, and combined shock absorbing means and guides carried by said first guides and engaging the tracks.

6. In a tractor construction, an axle, load carrying wheels journaled to said axle, annular tracks engaged by said wheels, guide rods slidably connected to said axle, guide rollers carried by said rods and engaging the tracks, and cushioning means carried by said rods.

7. A tractor construction comprising an arched rear axle having bifurcated ends, load carrying wheels journaled to the bifurcated ends of the axle, annular tracks engaged by the load carrying wheels, teeth on said tracks, ring gears secured to the load carrying wheels and engaging the teeth to establish driving connections between the load carrying wheels and the track, and shields secured to the bifurcated ends of the axle and adapted to prevent dirt or other foreign matter from coming in contact with the teeth of the load carrying wheels and the teeth of the annular track, and rollers carried by said shields and engaging the annular track.

In testimony whereof I affix my signature in presence of two witnesses.

CHARLES NOBLE.

Witnesses:
MATILDA E. HUNT,
MARY E. MARTIN.